INVENTOR.
WILLARD A. SAWYER

BY Head & Johnson

ATTORNEYS

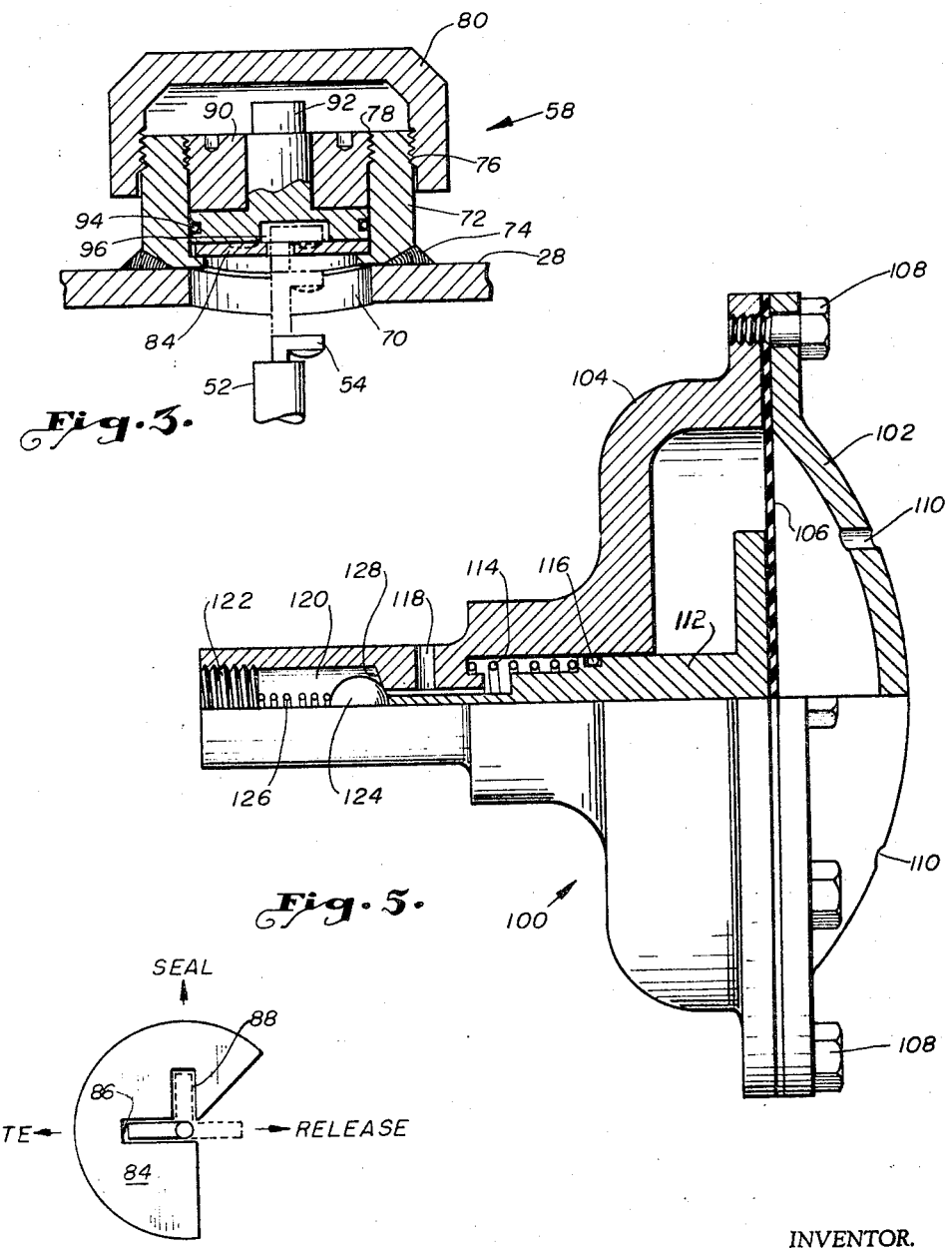

United States Patent Office 3,431,946
Patented Mar. 11, 1969

3,431,946
INFLATABLE PIPE PLUG
Willard A. Sawyer, 3127 E. 49th St.,
Tulsa, Okla. 74105
Filed Nov. 19, 1965, Ser. No. 508,700
U.S. Cl. 138—93         5 Claims
Int. Cl. F16l 55/12; F28g 1/12

ABSTRACT OF THE DISCLOSURE

An inflatable pipeline plug and line travel pig includes a fluid pressure actuated packer the control of which is achieved exteriorly of the pipe. After the plugging operation the device becomes a movable pig.

This invention relates to a combination pipeline plug and line traveling pig. More particularly, this invention relates to an inflatable pipeline plug adapted to seal off pipe or tubing temporarily such as those situations involving the connection of two submerged pipelines, the repair of products pipelines, the hydrostatic or other pressure testing of pipelines about to be placed into service, or as any other temporary flow or shut off means to repair pipelines and related equipment such as valves, etc.

It is a primary object of this invention to provide a plug adapted to be inserted within the interior of pipeline with means for expanding and retaining an inflatable packer connected thereto to plug the pipe, and to provide apparatus for converting said plug into a line traveling pig and releasing any exteriorly operated mechanism associated therewith for uninterrupted travel. A further object of this invention is to provide means for retracting normally expansible scraper cups for insertion within the pipe said means also capable of releasing said scraper cups into outward contact with the interior walls of the pipe which upon the application of pressure fluid will cause said line travel.

These and other objects of the invention will become more apparent upon further reading of the description and claims when taken in conjunction with the following illustrations of which:

FIGURE 3 is a partial sectional view of the exterior valve operator mechanism.

FIGURE 4 is a top elevation view of the valve actuator control disc.

FIGURE 5 represents an additional embodiment of this invention with regard to means for releasing the pressure within the plug.

Broadly speaking, the apparatus of this invention describes a pipe plug utilizing a valved controlled inflatable packer and supporting mandrel spaced between and in combination with expansible and contractable scraper cups wherein the control of the fluid pressure to actuate the packer is achieved exteriorly of the pipe. The invention includes a means likewise whereby the valve actuating mechanism is contractable within the pipe after usage and upon expansion of the scraper cups the apparatus becomes a pipeline pig capable of movement along the pipeline in a given direction by fluid pressure acting thereagainst. In addition to a manually operated valve control mechanism the invention includes a fluid pressure actuated means for converting a pipe lug into a movable pig.

DETAILED DESCRIPTION

Figure 1:
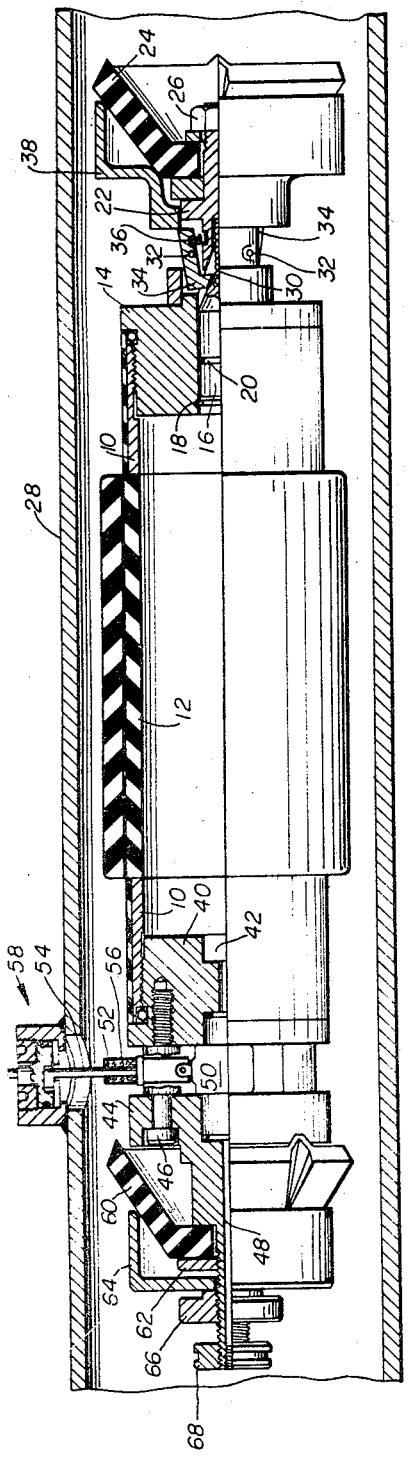
FIGURE 1 is a side elevational view, partly in section of the inflatable pipeline plug and pig of this invention in its retracted position.
Figure 2:
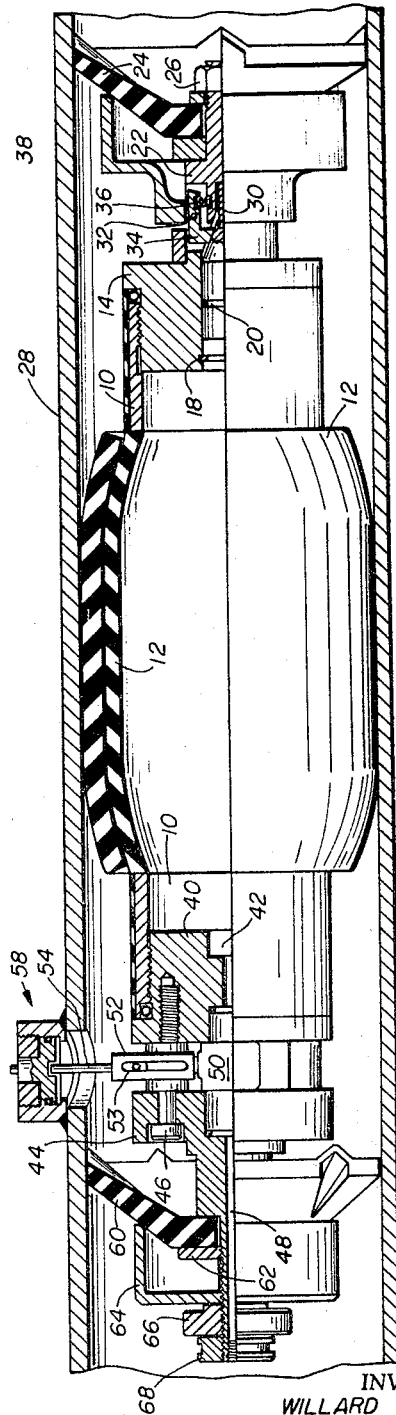
FIGURE 2 is a side elevational view, partly in section, of the apparatus of FIGURE 1 wherein the packer and scraper cups are shown in the expanded position.

Referring specifically now to FIGURES 1 and 2, the apparatus of this invention includes a support mandrel 10 to which is attached an expansible packer element 12 which can be a cylindrical type as shown or a spherical type. The first end of the mandrel 10 is closed by cylinder member 14 within which piston 16 reciprocates axially. A stop ring 18 terminates the movement of piston 16 to the left. The piston is sealed with respect to a cylinder by an O-ring seal 20. The outer end of the cylinder member 14 terminates with a threaded sleeve 22 to which resilient scraper cup 24 is retained by nut 26. The scraper cup 24 of this invention and others as described herein are of a resilient material which tend to normally expand outwardly into sealed contact with pipe 28. A spring member 30 is positioned between piston 16 and threaded sleeve 22 tending to normally return the piston to the left against the retaining ring 18. Pivotally supported about shafts 32 are trip latch members 34 which are biased in the direction shown in FIGURE 1 by spring 36. The left end of trip latch 34 includes a tapered follower surface adapted to follow upon a cam-like tapered surface of piston 16. The other end is adapted to latch cup retractor 38 and hold same in a position whereby scraper cup 24 is contracted from its expanded position in engagement with pipe 28.

The second end of the mandrel is closed by a cylindrical member 40 having a conduit 42 therein. A scraper cup sleeve 44 is retained thereto by a plurality of bolts 46. The scraper cup sleeve 44 includes a conduit 48 which communicates with conduit 42 by way of valve 50 which is retained between the cylindrical member 40 and the scraper cup sleeve 44 as shown. The valve includes a valve actuator sleeve 52 which upon rotation is adapted to open or close the valve 50. Retained within the sleeve 52 is a valve actuator 54 which operated upwardly against spring 56 which is tending to normally force the actuator 54 downwardly in a retracted position, as hereinafter more fully described. The actuator is used in conjunction with an exterior valve actuating mechanism generally designed by the numeral 58, more fully described in reference to FIGURES 3 and 4.

Scraper cup member 60 is retained upon sleeve 44 by threaded nut 62. Adjacent thereto is cup retractor 64 which is manually moved axially by threaded nut 66. A limit nut 68 is rigidly affixed to sleeve 44 at its extreme end to restrain the limits of cup retractor nut 66.

An important feature of this invention is the ability, under the adverse, even submerged, conditions, to operate the valve 50. This is accomplished by the exterior valve actuating mechanism generally designated by the numeral 58 and shown more specifically in FIGURES 3 and 4. An opening 70 is provided in pipe 28. The opening is surrounded by cylinder 72 which is welded as shown at 74 to pipe 28. The upper end of cylinder 72 includes exterior and interior threads 76 and 78 respectively. The exterior threads are adapted so as to receive a closure cap member 80 after the final release of valve actuator 54. A valve actuator control disc 84 forms the heart of this apparatus, a top elevational view of which is shown in FIGURE 4. The disc includes a partially cut away portion as shown and includes recess or identation means at its top at 86 and 88 which retains valve actuator 54 in its given positions until otherwise rotated. A cylindrical sleeve 90 is threadably attached to the interior of the threads 78 of cylinder 72 and acts to retain valve positioning plug 92. The plug includes an O-ring seal 94 and a recess 96 slightly larger than the valve actuator handle 54. The positioning plug is adapted, upon rotation, by a wrench or other suitable means upon the plug, to move the valve actuator to the various positions during the operation thereof which is hereafter described. During normal operation the cap 80 is removed as shown in FIGURES 1 and 2 and is only capped to prevent any future leakage therefrom or permit future access as the case may be.

The embodiment of FIGURE 5 represents an automatic release valve mechanism capable of usage in certain situations to replace valve element 50 and its heretofore described actuating means. This release valve is generally indicated by the numeral 100. The release valve comprises cast body halves 102 and 104 forming a chamber which is divided by a flexible diaphragm 106. The respective body halves and diaphragm being retained together by a plurality of circumferentially spaced bolts 108. Body 102 includes a plurality of openings 110 for fluid communication with the right half of the chamber. An actuator piston 112 is attached or otherwise movable by diaphragm 106 and operable in movement therewith against spring 114. The piston is sealed with respect to body 104 by an O-ring seal 116. A relief opening 118 is shown provided in the body 104 communicating with condut 120 which terminates its end with internal threads 122. A spring biased check valve 124, by the action of spring 126, operates thereagainst a valve seat 128 which is formed as a part of conduit 120. The release valve mechanism described is typically adapted to be axially attached to the right of scraper cup 24. A sealed conduit will interconnect the interior of mandrel 10 with the conduit 120 which under pressure conditions will tend to normally maintain check valve 120 closed until the other heretofore described operations have taken place. An additional modification includes the utilization of a check valve in place of valve 50 as is of the type well known to a man skilled in the art adapted to permit entrance of pressure fluids in the interior of mandrel 10 yet prevent the return flow in that direction, the release of pressure occurring by operation of the modification.

OPERATION

Operation of the apparatus of this invention will be described relative to a submerged pipeline installation wherein it is desired to connect two adjacent ends of pipe 28 and wherein it is desired to plug off the end of at least one pipe during such operation. Because the pipe plug of this invention must be received in the opposite direction in which it will eventually travel in the pipe, it is necessary that the scraper cups 24 and 60 be in the retracted or collapsed position. In that regard cup retractor 38 is positioned as shown in FIGURE 1 and retained thereby by trip latch 34. Likewise, at the second end, manually turning nut 66 will cause retractor 66 to move about the scraper cup 60 retracting and collapsing same. An opening 70 is suitably provided in the pipe prior to being submerged to which cylinder 72 is welded and attached coaxially thereabout. While, above the surface, the pipe plug and scraper cup unit is then inserted into the pipe adjacent its end and is so located that valve actuating rod and handle 54 is centered with respect to opening 70 and control disc 82. The handle is pulled upward and thence positioned within indentation 86 so as to be in the inflate position, i.e., valve 50 is open. The remaining parts of the valve actuating mechanism 58 are attached omitting the cover cap 80. Pressure fluid supply means, not shown, is attached so as to make communication with conduit 48 through open valve 50 and conduit 42 and into the interior of mandrel 10 upon which pressure fluid the packer 12 is inflated as shown in FIGURE 2. As the inflation pressure increases, piston 16 is caused to move to the right and by the action of the trip latches 34 following upon the tapered surfaces of the piston, the latches pivot about shaft 32 releasing cup retractor 38. The natural outward resilient bias of scraper cup 24 forces the cup retractor to the left and the position shown in FIGURE 2, whereby the scraper cup is in unidirectionally sealed contact with the pipe 28. Positioning plug 92 is rotated approximately 90° to the "seal" position wherein valve 50 is closed. Thereafter, by manually rotating nut 66 in a counterclockwise position cup retractor 64 follows to the left allowing expansion of scraper cup 60 into sealed contact, in the same direction as cup 24, with the interior walls of pipe 28. In this position both scraper cups are now sealed against the interior of the pipe and by reason of the inflated packer 12 the pipe is fully sealed. Therafter, the pipe is lowered into its submerged position in the water permitting divers to connect the adjacent ends of the pipeline or other portions of the line, after which the packer is ready to be removed. In that event, a diver removes cap 80 if not already done so and rotates positioning plug 92 approximately 90° in a clockwise direction to the "release" position whereupon valve actuator handle 54, by reason of spring 52, is caused to drop downwardly within the interior of pipe 28 and thus eliminate any obstruction to the future line travel of the apparatus of this invention. Upon this rotative movement the pressure within the interior of mandrel 10 is released allowing the inflatable packer to deflect, yet the scraper cups 24 and 60 respectively will maintain their sealed contact with the pipe. Thereupon, by the application of pressure fluid from the right side as shown against scraper cups 24 and 60, the pipe line plug becomes a pipeline pig for movement to the left and to a location where it can be removed. The diver has placed cap 80 upon the valve actuator release mechanism 58 which completely seals the pipe 28.

In utilizing the embodiment of the automatic valve releasing mechanism as shown in FIGURE 5, application of pressure fluid operates through openings 110 against diaphragm 106 forcing piston 112 to the left. This opens check valve 124 relasing the pressure within the interior of mandrel 10 to the exterior thereof through opening 118 while simultaneously providing that fluid pressure to move the pipeline plug and pig of this invention.

The invention has been described with reference to specific and preferred embodiments. It will be apparent, however, that other modifications can be made without departing from the spirit and scope of the invention. Accordingly, this invention should be construed not to be limited to the embodiment herein described but should be limited only by the scope of the appended claims.

What is claimed:
1. An apparatus comprising:
   a hollow support mandrel including fluid expansible packer in fluid communication with the interior thereof, the first end of said mandrel closed by an axially movable piston, the second end terminating with a fluid control valve, said valve including an actuator which is radially extensible, against spring bias, outward beyond the exterior of said pipe,
   a first scraper cup tending to normally expand outwardly against the interior of said pipe fixably positioned to said mandrel adjacent said first end,
   a retractor for said first cup axially movable thereto to retract said cup from an outward position against the interior of said pipe,
   a trip latch supported to said mandrel and pivoted by the movement of said piston from one position retaining said cup retracted to another position permitting the outward position of said cup,
   a second scraper cup substantially identical to said first cup and oriented in the same direction as said first cup and attached to said mandrel adjacent said second end, and a manually operable retractor for said second cup axially movable to retract said cup from its normal outer position, means to supply fluid pressure through said valve to the interior of said mandrel, and sealed means attachable to the exterior of said pipe for rotating said valve actuator from a position permitting pressure fluid to enter said mandrel to a position sealing said mandrel and thence to a position opening said mandrel and releasing said actuator into the interior of said pipe.

2. An apparatus according to claim 1 wherein said means to rotate said valve actuator is connected exteriorly of said pipe and includes a sealed valve positioning plug rotatable with respect to an arcuate valve actuator position control disc, said disc having means to receive and retain said valve actuator and to release said valve actuator from said exterior connection.

3. A pipe plug and unidirectional line travel apparatus comprising, a fluid pressure expansible packer positioned between spaced scraper cups, which cups are adapted to restrain fluid flow thereacross in one direction, retractor members for said cups, control means to supply, seal and release said fluid pressure to said packer, means operable by said fluid pressure to release one of said retractor members and mechanical means to release the other of said retractor members whereby said cups will expand into sealed engagement with the interior walls of said pipe, means to actuate said control means yet prevent interference with said line travel of said apparatus after said fluid pressure is released.

4. A pipe plug and unidirectional line travel apparatus comprising, a fluid pressure expansible packer positioned between spaced scraper cups, which cups are adapted to restrain fluid flow thereacross in one direction, retractor members for said cups, control means to supply, seal and release said fluid pressure to said packer, means operable by said fluid pressure to release at least one of said retractor members whereby said cups will expand into sealed engagement with the interior walls of said pipe, means located interiorly of said pipe to actuate said control means by fluid pressure in said pipe acting against said apparatus.

5. An apparatus according to claim 4 wherein said fluid pressure operates to release said packer and cause said unidirectional line travel.

References Cited

UNITED STATES PATENTS

| | | | |
|---|---|---|---|
| 1,221,733 | 4/1917 | Henderson | 138—90 |
| 2,399,544 | 4/1946 | Danner | 138—93 |
| 2,601,248 | 6/1952 | Brenholdt | 15—104.06 XR |
| 2,701,960 | 2/1955 | Irwin | 73—40.5 |
| 2,894,539 | 7/1959 | Cook et al. | 138—97 |
| 2,929,410 | 3/1960 | Morrison | 138—97 |
| 3,040,779 | 6/1962 | Guier | 138—97 |
| 3,106,735 | 10/1963 | Landrum et al. | 138—97 XR |
| 3,114,395 | 12/1963 | Immel | 138—97 |
| 3,153,845 | 10/1964 | Loomis | 73—40.5 XR |
| 3,285,290 | 11/1966 | Morrison | 138—97 |
| 3,298,399 | 1/1967 | Slade | 138—97 |
| 3,183,939 | 5/1965 | Immel | 138—97 |

HOUSTON S. BELL, JR., *Primary Examiner.*

U.S. Cl. X.R.

15—104.06; 73—40.5